Patented Oct. 7, 1941

2,258,556

UNITED STATES PATENT OFFICE 2,258,556

PROTECTING GOODS FROM VERMIN

Erik Schirm, Dessau, Anhalt, Germany

No Drawing. Application March 2, 1936, Serial No. 66,731. In Germany March 2, 1935

9 Claims. (Cl. 167—31)

It has been found that wool, textiles, furs, hair, feathers, leather, natural and artificial fibres, paper and also any products or articles containing such materials, can be protected from damage caused by moths or vermin of any kind, by treating those materials with inodorous or nearly inodorous aromatic hydroxy-compounds containing at least one higher aliphatic residue in the molecule. Compounds of this kind are especially the phenols, cresols, xylenols, guaiacols, hydroxy-diphenyls, hydroxy-diphenyl-methanes and naphthols, which at one carbon atom are substituted with higher alkyl radicals.

Said compounds may also contain further substituents on the aryl- or alkyl-group. Thus e. g. the corresponding alkyl-aryl-ketones may be applied. By "higher alkyl-groups" I mean groups such as the hexyl-, octyl-, decyl-, dodecyl-, tetradecyl-, hexadecyl-, and the octadecyl-radicals.

Such compounds are easily obtainable, e. g., by the condensation of olefins of any kind, further of primary, secondary and tertiary alcohols with straight or branched chain with any aromatic hydroxy-compounds. Thus one can use for the condensation e. g. the alcohols corresponding to the above mentioned alkyl-radicals. Inter alia it is practicable to condense together with aromatic hydroxy-compounds substances as fatty alcohols as e. g. pentyl-methyl-carbinol, β-ethyl-butyl alcohol, methyl-isobutyl carbinol, di-n-amyl-carbinol, methyl-hexyl-carbinol, oil of turpentine, pine oil, alcoholic and olefinic products obtained by the carbonization of wood, by brown coal distillation, cracking of petroleum and paraffins as well as by the synthesis of benzine, and to use the respective condensation-products either as mixtures or individually, according to the present invention.

Suitable compounds of the kind would be e. g.:

1. Isooctyl-phenols,
2. Isodecyl-thymol,
3. Isododecyl-phenols,
4. Isotetradecyl-phenols,
5. α,β-Dimethylpropyl-phenols,
6. Di-isobutyl-phenols,
7. Capronoyl-phenols of the formula

$C_5H_{11}.CO.C_6H_4OH$

8. Capryloyl-phenols,
9. Caprinoyl-phenols,
10. Lauroyl-phenols,
11. Myristoyl-phenols.

The normal alkyl-phenols obtainable from these ketones by reduction are likewise applicable. Compounds of the latter kind are e. g.:

12. Octyl-phenols,
13. Decyl-phenols,
14. 5-dodecyl-2-oxy-1-methyl-benzol,
15. Tetradecyl-phenols,
16. Hexadecyl-phenols,
17. Octadecyl-phenols.

The compounds proved particularly valuable which in their aromatic nucleus contain in addition one or more halogen atoms such as chlorine, bromine or fluorine and preferably in the p-position to the hydroxyl group. Compounds of this kind are e. g.:

18. The 4-chloro-2-isohexyl-phenol,
19. The 4-chloro-2-isoamyl-cresol,
20. The isooctyl-4-chloro-3-methyl-phenol,
21. The 4-chloro-2-isoheptyl-cresol,
22. The 4-chloro-2-isodecyl-phenol,
23. The 4,6-dichloro-2-isododecyl-phenol,
24. The 4,6-dichloro-2-isotetradecyl-phenol,
25. The 4-chloro-2-capronoyl-phenol,
26. The 4-chloro-2-capryloyl-phenol,
27. The 4-chloro-2-caprinoyl-phenol,
28. The 4-chloro-2-lauroyl-phenol,
29. The 4-chloro-2-myristoyl-phenol,
30. The 4-chloro-2-palmitoyl-phenol,
31. The 4-chloro-2-stearoyl-phenol as well as the normal alkyl-phenols obtainable by reducing the said ketones.

The above enumerated compounds may also contain further substituents and particularly might they be substituted with one or more halogen-, oxy-, alkyloxy-, alkyl-groups, heterocyclic residues and the like.

Instead of the aforementioned benzene derivates one may likewise apply corresponding derivates of other aromatic compounds such as naphthalene, diphenyl-, diphenyl-methane and the like.

Also the higher alkyl group may be substituted with groups of various kinds, such as aryl-radicals. The compounds proved particularly suitable which in the aliphatic chain are substituted by several oxyaryl-groups or by their derivates respectively. They may also be substituted by hydroxyl-, mercapto-, amino-groups or by their derivates such as ether-, sulfide-, and sulfone-groups. They may also contain any groups possessing the property of imparting water solubility such as the carboxyl group, the sulfonic acid group, the sulfuric acid ester group, the quaternary ammonia group as well as poly-oxy- and/or poly-ether groups.

Compounds of this kind are e. g.:

32. α,ω-Bis-(2-oxy-5-methyl-phenyl)-hexane,
33. β,ι-Bis-(2-oxy-5-chloro-phenyl)-decane,
34. α,δ-Bis-(2-oxy-5-chloro-phenyl)-α,-dioxo-butane,
35. The condensation product from 2 mols of 4-chloro-phenol with 1 mol of oleyl alcohol,
36. The condensation products from several mols of aromatic hydroxyl compounds or halogen-hydroxyl-compounds respectively and octodecendiol or octodecandiol respectively.

Finally may be cited as compounds of the aforementioned nature:

37. 2-(ω-methoxy-isodecyl)-4,6-dichloro-phenol, and
38. 2-isodecyl-4,6-dichloro-phenol-ω-sulfonic acid.

In the enumerated compounds the aliphatic chain may also be branched.

All these compounds may be used either individually or mixed with one another or alternatively also with an addition of other preserving agents. For instance their application may be performed in such a manner that the goods to be protected from moths and vermin of any, also tropical kind, are impregnated or sprinkled, dipped into or moistened etc. with solutions of the above mentioned compounds in benzine, halogen-hydrocarbons or in their mixtures e. g. in a mixture of carbontetrachloride and trichlorethylene or dichlor-ethane and the like. With products which crystallize easily it is possible to prevent any efflorescence especially on dark material, by the selection of the dissolving agent or solvent-mixture respectively or also of additional agents. For this purpose the use of e. g. higher alcohols, cyclohexanone and the like is recommended.

Furthermore those compounds may be prepared in the form of emulsions or of dispersions or also of aqueous solutions, provided they contain any groups with the property of rendering them water-soluble; the thus obtained products may then be applied for the treatment of the goods in about the same way as with a dyeing process. One then may employ therewith some wetting or emulsifying agent in order to secure a uniform penetration into the material.

Also by powdering it is possible to bring the goods into intimate contact with the new protecting agents, in using sprinklers, rolling casks or the like. If a user does not desire to employ the compounds in concentrated form, it is practicable to prepare them in combination with powdery substances such as absorbing agents e. g. infusorial earth, talc, wood powder, fuller's earth, starch etc., the resulting solid pulverized preparations to be applied in the indicated manner.

Another mode of application comprises uniting the compounds with soap or other capillary active agents, the thus obtained products being used for washing, impregnating and the like of the goods to be preserved.

The said compounds finally may be used in the presence of other substances such as acids, salts, mordants, dyeing stuffs and the like in order to enhance their efficiency or their sticking power or to improve other desirable properties.

The treatment may be performed either at ordinary or at a higher temperature.

Owing to the ease of performing the process in question, the treatment is practicable not only in the manufacture and working up of the goods, but also in the household and in cleansing establishments, such as in laundries for chemical washing or for cleaning with benzine or other solvent particularly with non-inflammable organic solvents.

Example 1

Hair, feathers, wool and the like are brought into a benzine solution of 4,6-dichloro-2-isodecyl-phenol. After a good soaking the material is taken out and centrifuged. After the solvent is evaporated the materials are thus rendered resistant against damage by moths.

Example 2

85 parts by weight of a melted neutral soap of good quality are thoroughly mixed with 15 parts by weight of 4,6-dichloro-2-isoheptyl-cresol. 1%-solutions of the thus obtained soap are suitable for washing wool, which is then protected from damage by moths. In a similar manner one may also use mixtures of the protecting agent with fatty alcohol sulfonates as well as with reaction products from fatty acid chlorides on amino-sulfonic acids, or on their salts respectively.

Example 3

A woolen material is treated at ordinary temperature with ten times its weight of a 2–3%-solution of the potassium compound of the 2-isoamyl-4-chloro-cresol, while adding gradually some diluted sulfuric acid to the bath. When the impregnating process is finished the material is centrifuged, rinsed and dried. Alternatively, one may also work with a moderately elevated temperature. By this treatment the material becomes resistant against damage by moths.

Example 4

A woolen material is treated after the manner of a dyeing process with ten times its weight of a 2–3%-solution of the sodium salt of 2-isooctyl-4,6-dichloro-phenol-ω-sulfonic acid, wherein it might be advantageous alternatively to add to the bath a salt having the property of promoting better contact, or also a suitable acid. After the subsequent treatment in the usual manner the material becomes resistant against damage by moths.

Example 5

In a drum one rolls fur goods with a mixture of 93% of talc and 7% of the 4,6-dichloro-2-isohexyl-phenol. After the treatment the talc is removed from the fur goods by brushing or beating, the goods thereby being made mothproof.

I claim:

1. Vermin-proofing agent containing 2-isooctyl-4,6-dichloro-phenol-ω-sulfonic acid.
2. Vermin-proofing agent containing α,ω-bis-(2-hydroxy-5-methyl-phenyl)-hexane.
3. A moth-proofing agent comprising a benzine soluble aromatic hydroxy compound containing at least one higher molecular aliphatic radical containing at least four carbon atoms, and containing more than one hydroxy substituted aromatic radical, said aliphatic and hydroxy radicals being joined to the aromatic nucleus.
4. A moth-proofing agent comprising a benzine soluble aromatic hydroxy compound substituted by at least one organic radical, all of such organic radicals being aliphatic in structure and at least one of which contains at least 4 carbon atoms, the aliphatic and hydroxy radicals being joined to the aromatic nucleus.

5. A moth-proofing agent comprising a benzine soluble halogen substituted aromatic hydroxy compound substituted in the nucleus by at least one organic radical, all of such organic radicals being aliphatic in structure, and at least one of which contains a higher molecular aliphatic radical of at least four carbon atoms, said aliphatic and hydroxy radicals being joined to the aromatic nucleus.

6. Moth-proofing agents comprising benzine soluble derivatives of halogen phenols substituted in the nucleus by at least one organic radical, all of such organic radicals being aliphatic in structure, and at least one of which contains a higher molecular aliphatic radical of at least four carbon atoms attached to the aromatic nucleus.

7. A moth-proofing composition comprising a benzine soluble aromatic hydroxy compound substituted in the nucleus by at least one organic radical, all of such organic radicals being aliphatic in structure, and at least one of which contains a higher molecular aliphatic radical of 6-18 carbon atoms, said aliphatic and hydroxy radicals being joined to the aromatic nucleus, together with a solvent of the group consisting of benzine, carbon-tetrachloride, trichlor-ethylene, dichlor-ethane, cyclohexanone, and higher alcohols.

8. A material liable to attack by moths having incorporated therein a benzine soluble aromatic compound substituted in the nucleus by a hydroxy radical and by at least one organic radical, all of such organic radicals being aliphatic in structure, and at least one of which contains an aliphatic radical of at least six carbon atoms.

9. Moth-proofing agents comprising aqueous solutions of benzine soluble aromatic hydroxy compounds substituted in the nucleus by at least one organic radical, all of such organic radicals being aliphatic in structure, and at least one of which contains a higher molecular aliphatic radical of at least four carbon atoms, said aliphatic and hydroxy radicals being joined to the aromatic nucleus and said aliphatic radical also containing a radical which imparts water solubility to the compounds.

ERIK SCHIRM.